Patented Aug. 18, 1931

1,819,680

UNITED STATES PATENT OFFICE

JOSEPH BENNETT HILL, OF PHILADELPHIA, PENNSYLVANIA, ASSIGNOR TO THE BARRETT COMPANY, A CORPORATION OF NEW JERSEY

PURIFICATION OF SOLID AROMATIC HYDROCARBONS

No Drawing.   Application filed March 29, 1921. Serial No. 456,706.

My invention relates to the process of purifying solid aromatic hydrocarbons, such as naphthalene, fluorene, acenaphthene, phenanthrene, etc. In the isolation and refining of such hydrocarbons as usually effected, the oil fraction containing the hydrocarbon is allowed to stand until the solid hydrocarbon has crystallized out, the oil being subsequently drained away from the crystals, leaving a product commonly known as "drained salts". These crystals still contain considerable adhering oil and other impurities, as is indicated by their depressed melting points, the "drained salts" of naphthalene, for example, showing a melting point usually between 65° C. and 72° C., whereas the melting point of pure naphthalene is slightly over 80° C. In the subsequent purifications of the hydrocarbons from this form, the usual procedure includes a removal of the bulk of adhering oil by centrifuging or other means and a washing of the molten or dissolved hydrocarbon at a fairly low temperature with sulfuric acid, aluminum chloride or other agent which tends to polymerize or otherwise remove impurities, such as the unsaturated hydrocarbons. The product is usually finally distilled to give the refined hydrocarbon. Where sulfuric acid is used for washing in the above process, the spent acid obtained is of so little value that it is usually discarded. This acid consists of a weak sulfuric acid contaminated with tar, sulfonic acids, etc., so as to make it practically worthless for other purposes as such and difficult to recover as a satisfactory acid. Where aluminum chloride or other agent is used for washing, the spent wash is also worthless.

I have found that the above process can be much shortened and simplified by washing the crude hydrocarbon directly with sulfuric acid at such a temperature that the sulfuric acid is completely exhausted in sulfonating the hydrocarbon. The hydrocarbon can then be distilled off from the crude sulfonic acids, through a baffle column or even a fractionating column, giving a refined product directly. The crude sulfonic acid residue remaining behind in the still is practically free from unsulfonated hydrocarbons, free sulfuric acid and water and is a valuable product, being applicable in the arts for the manufacture of synthetic tanning materials, the saponification of oils or other of the well known uses to which crude sulfonic acids may be applied.

In practicing my invention, I prefer to carry out the distillation of the hydrocarbon under vacuum, although distillation under atmospheric or increased pressure may be used. The vacuum distillation has the advantage of permitting a lower temperature and so producing a higher grade of sulfonic acid residue. Where fractional distillation is necessary, I prefer to have a fractionating column connected to the reaction vessel and distill the hydrocarbon from the sulfonic acid through this column. In some cases, however, it may be desirable to distill off the hydrocarbon first and subsequently re-distill it with fractionation.

The crude to be subjected to my treatment may be either the "drained salts" or may be the product obtained by removing the bulk of the oily impurities from this material by centrifuging or other means. If the latter is used, a refined hydrocarbon may be obtained, having a melting point much closer to the theoretical than is obtained by the usual refining process.

Without wishing to limit myself to any specific details or to any specific solid hydrocarbon, the following may serve as an example of one of the ways in which my process can be carried out.

1000 pounds of crude naphthalene are melted and brought to a temperature of 150° C., at which temperature 300 pounds of sulfuric acid are added and the mixture agitated until the reaction is complete. Vacuum is applied to the mixture and the unsulfonated naphthalene distilled off through a suitable fractionating column, the refined naphthalene fraction being cut from the column. The crude naphthalene sulfonic acid is run out of the still after distillation is complete.

The advantages which I claim for my process are a shorter, simpler and more economical handling of the crude hydrocarbon to produce refined, and the simultaneous production of a high quality, valuable by-product, to wit, the crude sulfonic acid of the hydrocarbon, the value of which is enhanced by the fact that it is substantially free from sulfuric acid.

I claim:

1. The process of refining crude hydrocarbons of the aromatic series, which hydrocarbons are solid at ordinary temperature, comprising the treatment of the crude hydrocarbons with sulfuric acid in a proportion less than the theoretical amount required to completely sulfonate the hydrocarbons, said treatment being continued until substantially all of the sulfuric acid is used up and the subsequent distillation of the unsulfonated hydrocarbons from the sulfonic acids produced.

2. The process of refining crude hydrocarbons of the aromatic series, which hydrocarbons are solid at ordinary temperatures, comprising the treatment of the crude hydrocarbon with sulfuric acid at a temperature sufficiently high to sulfonate impurities and a portion only of the hydrocarbon, and to cause substantially all of the sulfuric acid to react and a subsequent distillation of the unsulfonated hydrocarbon from the sulfonic acid residue.

3. The process of refining crude naphthalene, comprising the treatment of the crude naphthalene with sulfuric acid in an amount sufficient to sulfonate the impurities and a portion only of the naphthalene, and at a temperature sufficiently high to cause substantially all of the sulfuric acid to react and a subsequent distillation of the unsulfonated naphthalene from the sulfonic acid residue.

4. The process of refining crude hydrocarbons of the aromatic series, which hydrocarbons are solid at ordinary temperatures, comprising the steps of treating the crude hydrocarbons with sulfuric acid at a temperature of about 150° C. and in amount sufficient to react with all of the impurities but insufficient to sulfonate all of the hydrocarbons, continuing the reaction until substantially all of the sulfuric acid has combined with the hydrocarbons and impurities, and separating the hydrocarbons from the resulting sulfonic acids by distillation.

5. A process of refining crude hydrocarbons of the aromatic series, which hydrocarbons are solid at ordinary temperatures, comprising the treatment of the hydrocarbon with an amount of sulfuric acid sufficient for reaction with impurities contained in the hydrocarbon but less in quantity than the theoretical amount required to completely sulfonate the hydrocarbon, continuing the reaction until substantially all of the sulfuric acid is chemically combined with the hydrocarbon and impurities and subsequently distilling the unsulfonated hydrocarbon from the sulfonic acids produced.

6. A process of refining naphthalene which comprises treating naphthalene with an amount of sulfuric acid sufficient for reaction with impurities contained in the naphthalene but less in quantity than the theoretical amount required to completely sulfonate the naphthalene, continuing the reaction until substantially all of the sulfuric acid is chemically combined with the naphthalene and impurities and subsequently distilling the naphthalene from the sulfonic acids produced.

7. A process of refining naphthalene which comprises treating naphthalene at a temperature of about 150° C. with an amount of sulfuric acid sufficient for reaction with impurities contained in the naphthalene but less in quantity than the theoretical amount required to completely sulfonate the naphthalene, continuing the reaction until substantially all of the sulfuric acid is chemically combined with the naphthalene and impurities and subsequently distilling the naphthalene from the sulfonic acids produced.

8. The process of refining crude hydrocarbons of the aromatic series, which hydrocarbons are solid at ordinary temperatures, comprising the treatment of the crude hydrocarbon with sulfuric acid in an amount sufficient to sulfonate substantially all the impurities and a portion only of the hydrocarbon and at a temperature sufficiently high and for a sufficient length of time to cause substantially all of the sulfuric acid to react.

9. The process of refining crude naphthalene, comprising the treatment of the crude naphthalene with sulfuric acid in an amount sufficient to sulfonate substantially all the impurities and a portion only of the naphthalene and at a temperature sufficiently high and for a sufficient length of time to cause substantially all of the sulfuric acid to react.

10. The process of refining crude naphthalene which comprises the mixing of crude naphthalene and sulfuric acid in the proportions of substantially 10 to 3, respectively, at a temperature of approximately 150° C. and the subsequent distillation of the naphthalene from the reaction residue.

11. The process of refining crude hydrocarbons of the aromatic series, which hydrocarbons are solid at ordinary temperature, comprising the treatment of the crude hydrocarbon with sulfuric acid in a proportion sufficient to sulfonate all of the impurities but less than the theoretical amount to sulfonate all of the hydrocarbons, said treatment being continued until substantially all of the sulfuric acid is used up, and the subsequent distillation of the unsulfonated hydrocarbon from the sulfonic acids produced under a pressure less than atmospheric pressure.

12. The process of refining naphthalene which comprises treating naphthalene at a temperature of about 150° C. with an amount of sulfuric acid sufficient for reaction with impurities contained in the naphthalene but less in quantity than the theoretical amount required to completely sulfonate the naphthalene, continuing the reaction until substantially all of the sulfuric acid is chemically combined with the naphthalene and impurities and subsequently distilling the naphthalene from the sulfonic acids produced under a pressure less than atmospheric pressure.

In testimony whereof I affix my signature.

JOSEPH BENNETT HILL.